(12) United States Patent
Perez Barrera et al.

(10) Patent No.: US 11,072,295 B2
(45) Date of Patent: Jul. 27, 2021

(54) AUTONOMOUS BUS BICYCLE RACK

(71) Applicant: Ford Global Technologies, LLC, Dearborn, MI (US)

(72) Inventors: Oswaldo Perez Barrera, Estado de Mexico (MX); Alvaro Jimenez Hernandez, Mexico City (MX)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 15 days.

(21) Appl. No.: 16/487,139

(22) PCT Filed: Feb. 22, 2017

(86) PCT No.: PCT/US2017/018936
§ 371 (c)(1),
(2) Date: Aug. 20, 2019

(87) PCT Pub. No.: WO2018/156118
PCT Pub. Date: Aug. 30, 2018

(65) Prior Publication Data
US 2020/0055459 A1    Feb. 20, 2020

(51) Int. Cl.
*B60R 9/10* (2006.01)
*B60R 9/06* (2006.01)
*B62H 3/08* (2006.01)
*B62H 3/12* (2006.01)
*B63H 5/00* (2006.01)
*B62H 5/00* (2006.01)

(52) U.S. Cl.
CPC .......... *B60R 9/10* (2013.01); *B60R 9/06* (2013.01); *B62H 3/08* (2013.01); *B62H 3/12* (2013.01); *B62H 5/00* (2013.01)

(58) Field of Classification Search
CPC .... B60R 9/10; B60R 9/06; B62H 3/08; B62H 3/12; B62H 5/00
See application file for complete search history.

(56) References Cited

U.S. PATENT DOCUMENTS 4,171,077 A      10/1979  Richard, Jr.
5,278,538 A *    1/1994   Ainsworth ............... B62H 3/04
                                                    180/287

(Continued)

FOREIGN PATENT DOCUMENTS

CN     104385994 A     3/2015
CN     105235779 A     1/2016

(Continued)

OTHER PUBLICATIONS

Chinese Notification of First Office Action dated Aug. 4, 2020 re Appl. No. 2017800870694.

(Continued)

*Primary Examiner* — Stanton L Krycinski
(74) *Attorney, Agent, or Firm* — Brandon Hicks; Bejin Bieneman PLC (57) ABSTRACT

A vehicle system includes a bicycle lock and a processor. The processor is programmed to receive a bicycle slot reservation message, assign the bicycle slot reservation message to a bicycle slot of an autonomous bus, command the bicycle lock associated with the bicycle slot to an unlocked position, detect a bicycle placed in the bicycle slot, and command the bicycle lock to a locked position.

18 Claims, 10 Drawing Sheets

(56) References Cited

U.S. PATENT DOCUMENTS

| | | | | |
|---|---|---|---|---|
| 5,917,407 | A | * | 6/1999 | Squire .................... B62H 3/00 194/205 |
| 6,157,315 | A | * | 12/2000 | Kokubo ................ G07B 15/00 211/5 |
| 8,005,595 | B2 | | 8/2011 | Marriott et al. |
| 8,437,873 | B2 | | 5/2013 | North |
| 9,272,708 | B2 | * | 3/2016 | Cuddihy ............... B60W 30/00 |
| 9,499,223 | B2 | * | 11/2016 | Oviatt .................... B62H 3/00 |
| 9,840,855 | B2 | * | 12/2017 | Lin ........................ E05B 71/00 |
| 9,972,148 | B2 | * | 5/2018 | Huennekens ........... B60R 25/24 |
| 10,380,467 | B2 | * | 8/2019 | Clark ...................... B60R 9/10 |
| 10,641,014 | B2 | * | 5/2020 | Tepper ................... G07C 9/33 |
| 2003/0080169 | A1 | | 5/2003 | Munoz et al. |
| 2011/0148346 | A1 | * | 6/2011 | Gagosz .................. B62M 6/40 320/103 |
| 2012/0215346 | A1 | * | 8/2012 | Gingher .................. G07C 9/33 700/237 |
| 2015/0094896 | A1 | | 4/2015 | Cuddihy et al. |
| 2015/0102898 | A1 | | 4/2015 | Huennekens et al. |
| 2015/0330109 | A1 | | 11/2015 | Tepper et al. |
| 2017/0043827 | A1 | | 2/2017 | Oviatt |

FOREIGN PATENT DOCUMENTS

| | | | | |
|---|---|---|---|---|
| CN | 105711683 | A | | 6/2016 |
| DE | 102011012904 | A1 | * | 3/2011 ............... B62H 3/12 |
| KR | 1020130035303 | A | | 4/2013 |
| WO | 2003008236 | A1 | | 1/2003 |

OTHER PUBLICATIONS

International Search Report and Written Opinion dated May 16, 2017 re Appl. No. PCT/US2017/018936.

\* cited by examiner

AUTONOMOUS BUS BICYCLE RACK

BACKGROUND

An autonomous bus is a bus that autonomously navigates from one stop to the next. The autonomous bus autonomously navigates to predetermined locations (i.e., "bus stops"), stops at each location, opens the door so that passengers can enter or exit the bus, collects payment information, etc., without a driver.

DETAILED DESCRIPTION

Some people use a combination of transportation options during their commute. For instance, someone's commute may involve a bus and a bicycle. The bus may be equipped with a bicycle rack to accommodate such users. Racking and removing a bicycle from a rack located on a bus takes time, however. A human bus driver can wait until the bicycle has been removed from the rack before driving away from the bus stop. An autonomous bus, that is, a bus without a human driver, may not know that a rider needs to remove his or her bicycle from the bicycle rack. Thus, the autonomous bus may not give bicycle riders time to exit the bus and remove his or her bicycle.

One solution includes implementing a bicycle rack reservation system in the autonomous bus. The bicycle rack reservation system helps the autonomous bus determine which riders have bicycles located on the bicycle rack. It also coordinates which bicycle rack is used by which rider. Moreover, the bicycle rack reservation system allows riders to reserve a spot on the bicycle rack at the time the rider purchases his or her bus ticket. Thus, the rider will know that the autonomous bus will have room for the bicycle before the rider arrives at the bus.

An example bicycle rack reservation system includes a bicycle lock and a processor. The processor is programmed to receive a bicycle slot reservation message, assign the bicycle slot reservation message to a bicycle slot of an autonomous bus, command the bicycle lock associated with the bicycle slot to an unlocked position, detect a bicycle placed in the bicycle slot, and command the bicycle lock to a locked position.

In one possible implementation, the bicycle lock includes a first wheel support and a first actuator configured to move the first wheel support in accordance with signals output by the processor. The bicycle lock may further include a second wheel support spaced from the first wheel support. In such instances, the bicycle lock includes a second actuator configured to move the second wheel support in accordance with signals output by the processor. The bicycle lock may include a rail, and the first wheel support and the second wheel support may move relative to the rail. The distance between the first wheel support and the second wheel support may change. For instance, the processor may be programmed to command the first actuator to move along the rail before commanding the second actuator to move along the rail. The bicycle rack reservation system may further include a sensor programmed to detect the bicycle placed in the bicycle slot and output a signal indicating that the bicycle has been placed in the bicycle slot. The processor may be programmed to detect the bicycle placed in the bicycle slot based at least in part on the signal output by the sensor. The bicycle rack reservation system may further include a camera programmed to capture an image. The processor may be programmed to receive the image captured by the camera, process the image, determine that the image is of a bicycle owner, and command the bicycle lock to the unlocked position after determining that the image is of the bicycle owner.

In another possible implementation, the bicycle rack reservation system may have multiple bicycle locks. That is, the bicycle rack reservation system may have a first bicycle lock associated with a first bicycle slot of an autonomous bus and a second bicycle lock associated with a second bicycle slot of the autonomous bus. The processor may be programmed to receive a bicycle slot reservation message, assign the bicycle slot reservation message to the first bicycle slot, command the first bicycle lock to an unlocked position, detect a bicycle placed in the first bicycle slot, and command the first bicycle lock to a locked position. The first bicycle lock and the second bicycle lock may each include a first wheel support and a first actuator configured to move the first wheel support in accordance with signals output by the processor. The first bicycle lock and the second bicycle lock may each include a second wheel support spaced from first wheel support. The first bicycle lock and the second bicycle lock may each include a second actuator configured to move the second wheel support in accordance with signals output by the processor. The first bicycle lock and the second bicycle lock each include a rail, and the first wheel support and the second wheel support move relative to the rail. The processor is programmed command the first actuator of the first bicycle lock to move along the rail of the first bicycle lock before commanding the second actuator of the first bicycle lock to move along the rail of the first bicycle lock. Further, a first sensor may be programmed to detect the bicycle placed in the first bicycle slot and output a signal indicating that the bicycle has been placed in the first bicycle slot. The processor may be programmed to detect the bicycle placed in the first bicycle slot based at least in part on the signal output by the first sensor. A camera may be programmed to capture an image, and the processor may be programmed to receive the image captured by the camera, process the image, determine that the image is of a bicycle owner of the bicycle in the first bicycle slot, and command the first bicycle lock to the unlocked position after determining that the image is of the bicycle owner of the bicycle in the first bicycle slot.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
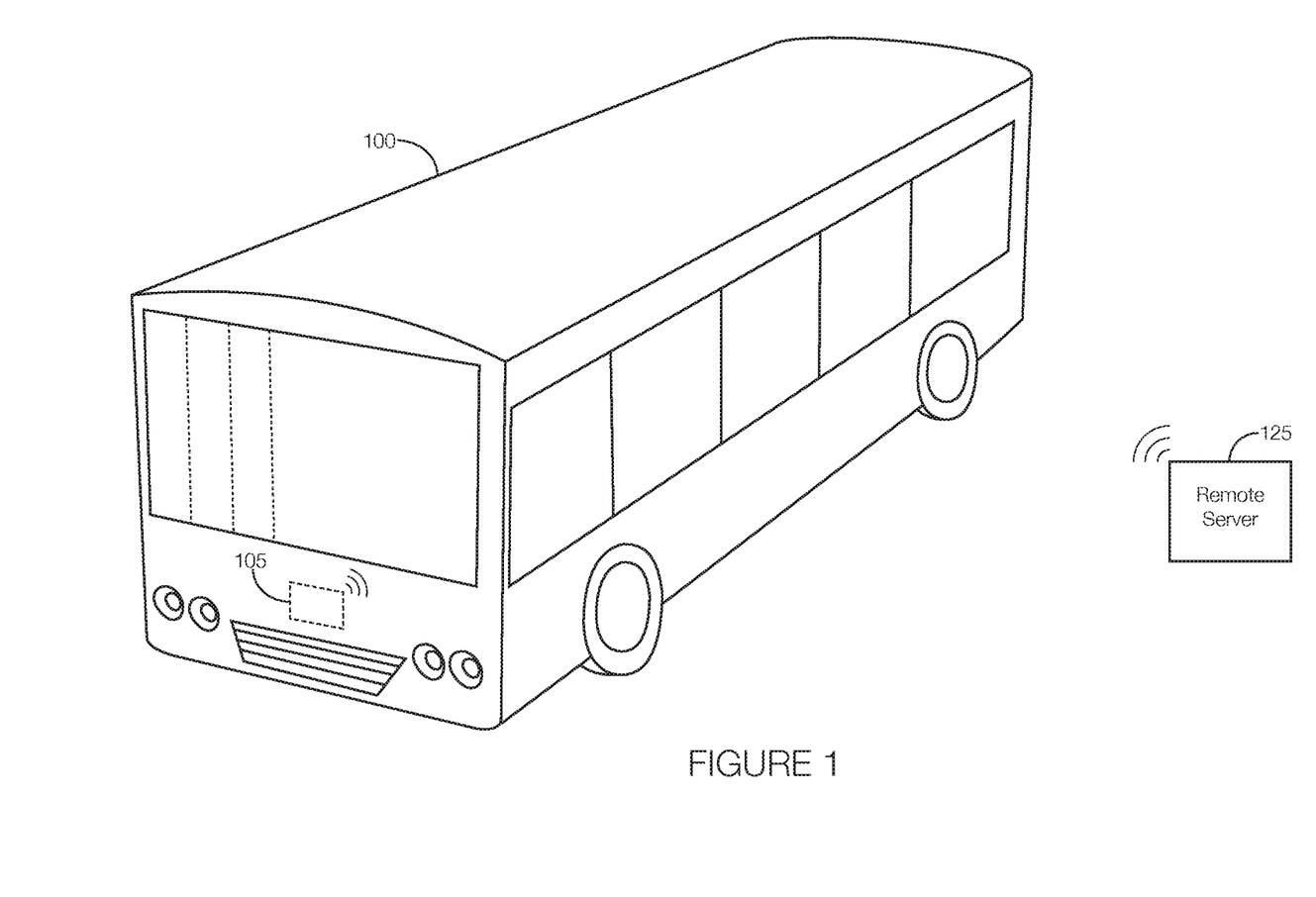
FIG. 1 illustrates an example autonomous bus with a bicycle rack reservation system.
Figure 2:
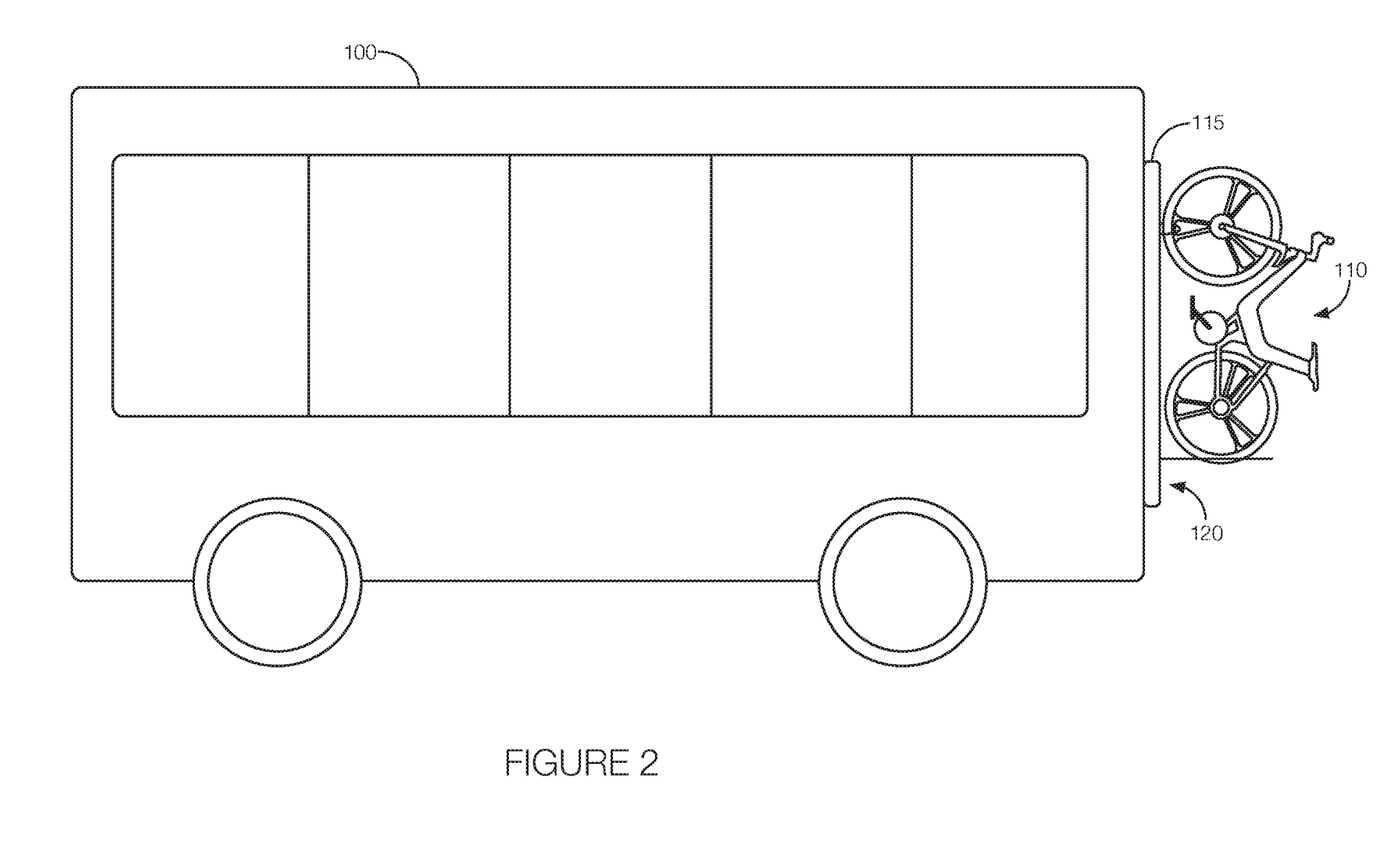
FIG. 2 is a side view of the autonomous bus with a bicycle in a bicycle rack attached to the autonomous bus.

FIGS. 1 and 2 illustrate an example autonomous bus 100 with a bicycle rack reservation system 105. FIG. 1 shows the autonomous bus 100. FIG. 2 is a side view of the autonomous bus 100 with a bicycle 110 in a bicycle rack 115 with one or more bicycle slots 120.

The autonomous bus 100 is a large automobile able to simultaneously transport numerous passengers by road. The autonomous bus 100 may operate in an autonomous (e.g., driverless) mode, a partially autonomous mode, or a non-autonomous mode. When operating in an autonomous mode, the autonomous bus 100 navigates to various stops, allows passengers to enter or exit the autonomous bus 100, collects payment information, etc., without a driver present. Moreover, as discussed in greater detail below, with the bicycle rack reservation system 105, the autonomous bus 100 is able to accommodate bicycle riders.

The bicycle rack reservation system 105 receives a bicycle slot reservation message, assigns the bicycle slot reservation message to a bicycle slot 120, and allows the passenger to stow his or her bicycle 110 in the assigned bicycle slot 120. The bicycle rack reservation system 105 wirelessly receives the bicycle slot reservation message from a remote server 125. The remote server 125 transmits the bicycle slots reservation message when a passenger purchases a ticket for the autonomous bus 100 and indicates that the passenger needs to stow a bicycle 110 while riding the autonomous bus 100. The remote server 125 determines whether the autonomous bus 100 has any remaining bicycle slots 120 for the part of the trip where the passenger needs a bicycle slot 120. The open slot is reserved when the passenger purchases his or her ticket.

Figure 3:
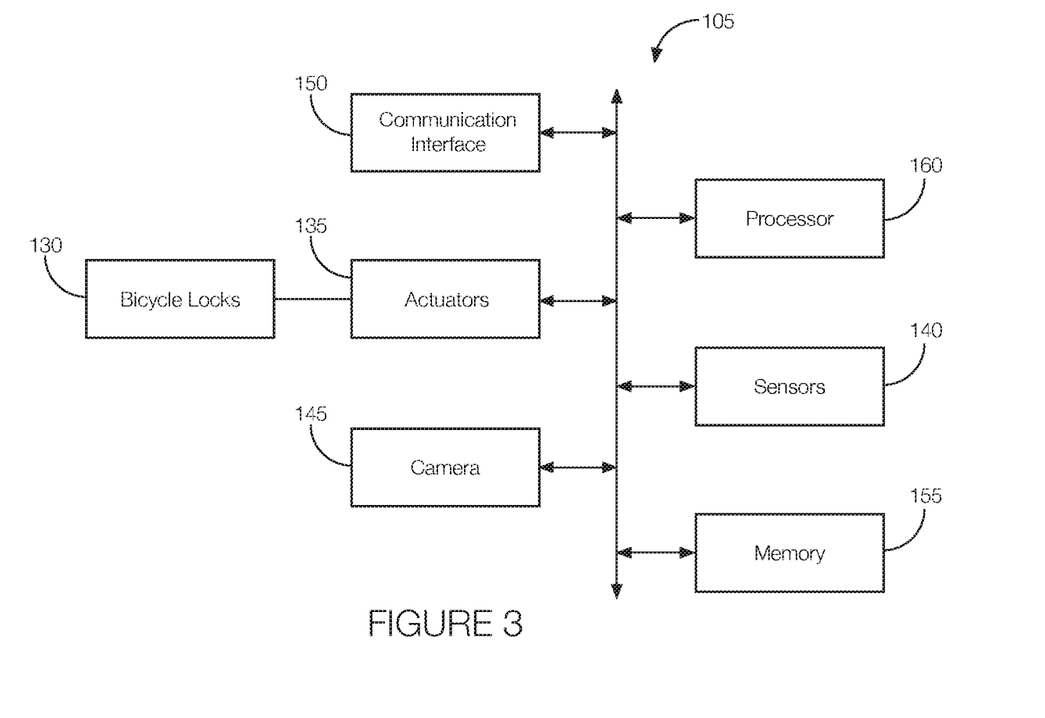
FIG. 3 is a block diagram showing example components of the bicycle rack reservation system.

FIG. 3 is a block diagram showing example components of the bicycle rack reservation system 105 and of the autonomous bus 100. The components shown in FIG. 2 include bicycle locks 130, actuators 135, sensors 140, a camera 145, a communication interface 150, a memory 155, and a processor 160. A bus connecting some of the components is shown for purposes of simplicity. It is possible that certain components will communicate directly with one another. Further, the line between the actuators 135 and the bicycle locks 130 may indicate a physical connection as opposed to signal communication.

Figure 4:
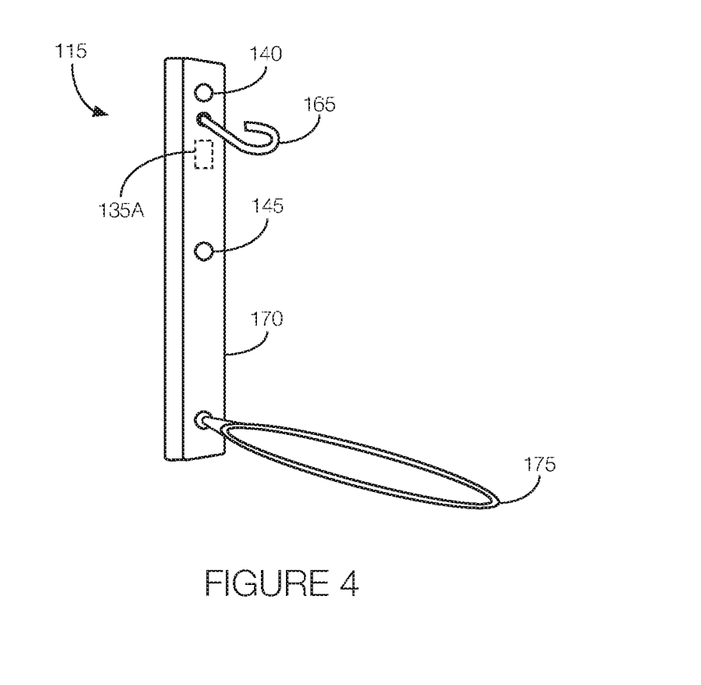
FIG. 4 illustrates example components of a bicycle lock controlled by the bicycle rack reservation system.
Figure 5A:
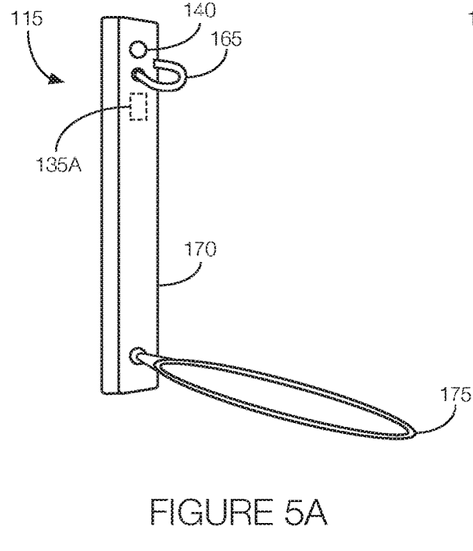
FIGS. 5A-5B illustrate different states of the bicycle lock.
Figure 5B:
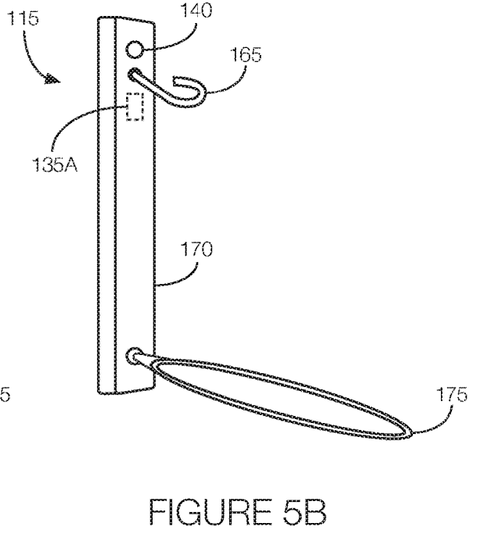
Figure 6:
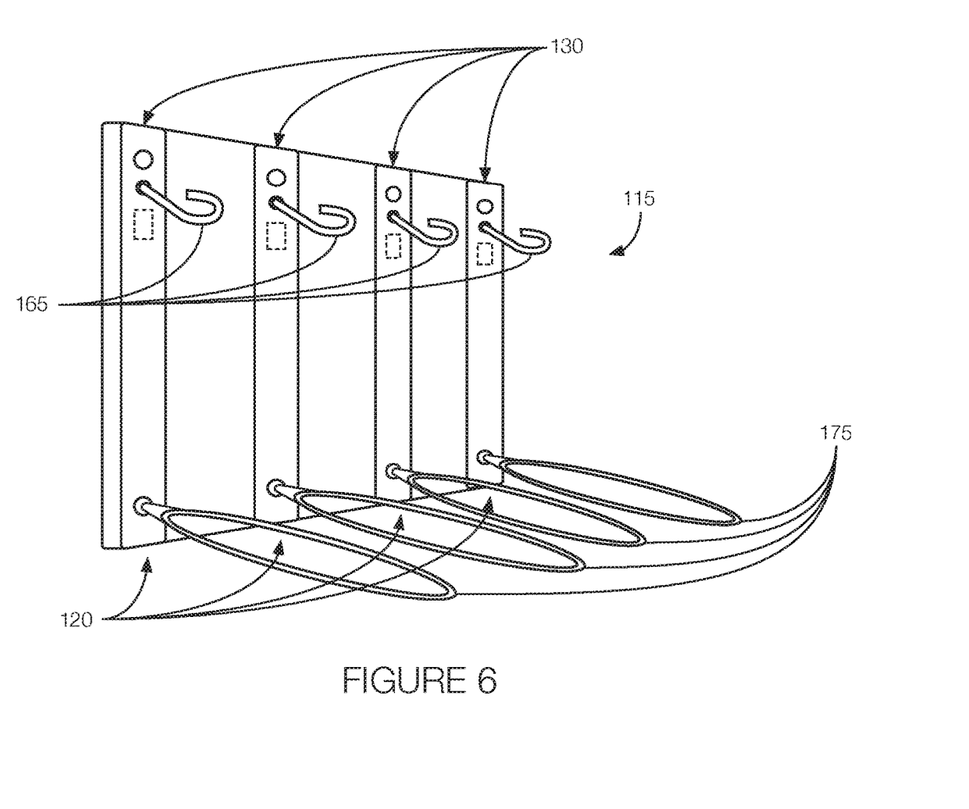
FIG. 6 illustrates the bicycle rack having multiple bicycle locks.

The bicycle locks 130 include physical structures for holding a bicycle 110 in place while the autonomous bus 100 is moving. As shown in FIGS. 4-6 and described below, the bicycle lock 130 may include a first wheel support 165 implemented via a hook. In another possible implementation, shown in FIGS. 7C and 7D, the bicycle lock 130 includes the first wheel support 165 implemented via a claw. The first wheel support 165 may be formed from a rigid material, such as metal, a rigid rubber, a rigid plastic, or a rigid foam. The claw may have movable fingers. The first wheel support 165 may be mounted to a rail 170. The bicycle lock 130 is moveable from an unlocked position to a locked position, and vice versa. Moving the bicycle lock 130 between the unlocked position and the locked position may include opening the first wheel support 165 (e.g., moving the first wheel support 165 in a way that causes an opening large enough to receive part of a bicycle tire). That could include moving the hook away from the rail 170 to create space between one end of the hook and the rail 170. It could alternatively mean opening the claw (e.g., separating fingers to create space). The bicycle lock 130 may further include a second wheel support 175 as shown in various figures. The second wheel support 175 may be formed from a rigid material such as metal, a rigid rubber, a rigid plastic, a rigid foam, or the like. As shown in the Figures, the second wheel support 175 is implemented with a rim having an elliptical shape and defining an opening. The bicycle wheel extends partially into the opening. The bicycle wheel is supported by the rim of the second wheel support 175. Another implementation may have the wheel support implemented via a claw or hook. The second wheel support 175 helps prevent the bicycle 110 from swinging while the autonomous bus 100 is moving.

The actuators 135 are mechanically attached to the bicycle locks 130. Each actuator 135 is controlled by control signals output by the processor 160. That is, electrical control signals output by the processor 160 may be converted into mechanical motion by the actuator 135. Further, each actuator 135 may be associated with a particular bicycle slot 120 and a particular part of the bicycle lock 130. Each bicycle lock 130 may use multiple actuators 135. Actuators 135, such as the first actuator 135B and the second actuator 135C, discussed below, may move the first wheel support 165 and second wheel support 175, respectively, along the rail 170. Further, actuators 135, referred to as state actuators 135, may move the bicycle lock 130 between the locked and unlocked positions. In other words, the state actuators 135A may move the hooks away from the rail 170 to create a space to receive a bicycle wheel, may separate the fingers of the claws, or both. Examples of actuators 135 may include a linear actuator, a servo motor, or the like.

The sensors 140 are implemented via circuits, chips, or other electronic components that can detect a bicycle 110 located in one of the bicycle slots 120. The sensors 140 may be implemented via a proximity sensor, such as an ultrasonic sensor. Each sensor 140 may be located on or near one or more bicycle locks 130. The sensor 140 may detect an object, such as a bicycle 110, located near the lock. If the object is close enough, the sensor 140 may determine that the bicycle 110 is properly situated in the bicycle lock 130 (e.g., the first wheel support 165 and the second wheel support 175). The sensor 140 may output a signal indicating that the bicycle 110 is situated in the bicycle lock 130. The signal may be output to the processor 160, which as discussed below, may use the signal from the sensor 140 to control the actuator 135 to, e.g., move the bicycle lock 130 to the locked position. Multiple sensors 140 may be associated with each bicycle slot 120. That is, one sensor 140 may look for an object near the first wheel support 165. Another sensor 140 may look for an object in the second wheel support 175.

The camera 145 is a vision sensor located on or in the autonomous bus 100 with a view of passengers as they enter or exit the autonomous bus 100. The autonomous bus 100 may include any number of cameras 145. For instance, one camera 145 may capture images of passengers as they enter the autonomous bus 100. Another camera 145 may capture images of passengers as they exit the autonomous bus 100. Each camera 145 may include a lens that projects light toward, e.g., a CCD image sensor, a CMOS image sensor, etc. The camera 145 processes the light and generates an image. The image may be output to the processor 160 and, as discussed in greater detail below, can be used to identify whether the person exiting the autonomous bus 100 is the owner of one of the bicycles 110 in one of the bicycle slots 120. Further, the image taken when a passenger boards the autonomous bus 100 may be used to associate the passenger to one of the bicycle slots 120. Thus, the processor 160 can determine which bicycle locks 130 to unlock based on which passengers have exited the autonomous bus 100.

The communication interface 150 is implemented via circuits, chips, or other electronic components that facilitate wireless communication between the autonomous bus 100 and the remote server 125. The communication interface 150 may be programmed to receive the bicycle slots reservation message from the remote server 125. The communication interface 150 may be further programmed to wirelessly transmit a list of available bicycle slots 120 to the remote server 125. The communication interface 150 may transmit updates to the list each time a bicycle slot 120 is reserved, used, or both. The communication interface 150 may be programmed to communicate with the remote server 125 in response to a command from the processor 160. That is, the command from the processor 160 causes the communication interface 150 to transmit availability of the bicycle slots 120 to the remote server 125, request bicycle slots reservation messages from the remote server 125, etc. The communication interface 150 may be programmed to communicate in accordance with any number of wired or wireless communication protocols. For instance, the communication interface 150 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc.

The memory 155 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 155 may store data such as a virtual map or table identifying future vehicle stops. The data stored in the memory 155 may be accessible to the processor 160 and possibly other components of the bicycle rack reservation system 105, the autonomous bus 100, or both.

The processor 160 is implemented via circuits, chips, or other electronic components that are programmed to control various operations of the bicycle rack reservation system 105. The processor 160 is programmed to receive the bicycle slots reservation message transmitted from the remote server 125, assign the bicycle slots reservation message to an available bicycle slot 120 on the autonomous bus 100, command the bicycle lock 130 of the assigned bicycle slot 120 to an unlocked position, detect that the bicycle 110 has been placed in the bicycle slot 120, and command the bicycle lock 130 to the locked position.

The processor 160 may be programmed to receive signals output by various components of the bicycle rack reservation system 105, the autonomous bus 100, or both. The processor 160 may be programmed to receive signals from the remote server 125 via the communication interface 150, from the sensors 140, from the camera 145, from the memory 155, etc. Moreover, the processor 160 may be programmed to output signals to various components of the bicycle rack reservation system 105, the autonomous bus 100, or both. That is, the processor 160 may be programmed to output signals to the actuators 135, the sensors 140, the camera 145, the communication interface 150, the memory 155, etc.

For instance, the processor 160 may be programmed to receive the bicycle slots reservation message from the remote server 125 via the communication interface 150. The processor 160 may process the bicycle slots reservation message and assign the message to one of the available bicycle slots 120. A list of available bicycle slots 120 may be stored in the memory 155. The processor 160 may update the list each time a bicycle slot 120 is assigned or a passenger with a bicycle 110 removes his or her bicycle 110 from the assigned slot. The bicycle slots reservation message may include a time, a bus stop location, or another indicator of when the passenger with the bicycle 110 will need to use the available bicycle slot 120. When the autonomous bus 100 arrives at that bus stop or at the time indicated in the bicycle slots reservation message, the processor 160 may command the bicycle lock 130 to the unlocked position. That is, the processor 160 may output a control signal to one of the actuators 135. The control signal may cause the actuator 135 to unlock the bicycle lock 130 (e.g., move the first wheel support 165 to a position where it can receive the bicycle tire).

In some instances, the processor 160 may verify the identity of the passenger with the bicycle 110 prior to commanding the bicycle lock 130 to the unlocked position. The processor 160 may be programmed to verify the identity of the passenger based on signals output by the camera 145, based on signals output by a ticket scanner located in the autonomous bus 100, or the like. When the passenger has been verified, the processor 160 may command the bicycle lock 130 to the unlocked position.

The processor 160 may determine that the bicycle 110 has been placed in the lock based on signals output by the sensor 140 associated with the bicycle slot 120. The sensor 140 may detect the presence of the bicycle 110 in the bicycle slot 120 and output a signal to the processor 160 indicating as much. The receipt of the signal from the sensor 140 may cause the processor 160 to command the bicycle lock 130 to the locked position. That is, the processor 160 may command an actuator 135 to move the first wheel support 165 to a position where the bicycle tire cannot be removed.

When the passenger exits the bus, the processor 160 may be programmed to command the bicycle lock 130 to the unlocked position. That way, the bicycle 110 can be removed. The processor 160 may command the bicycle lock 130 to the unlocked position by outputting a signal to one of the actuators 135. The actuator 135 may move the first wheel support 165 to a position where the bicycle tire can be removed. Before commanding the bicycle lock 130 to the unlocked position, the processor 160 may be programmed to confirm that the passenger has exited the bus. The bicycle slots reservation message may indicate where the passenger intends to exit the autonomous bus 100. The processor 160 may be programmed to wait for the autonomous bus 100 to arrive at that location before commanding the bicycle slot 120 to unlock. In some instances, the processor 160 may command the camera 145 to capture a subsequent image of the passenger exiting the autonomous bus 100, process that image to confirm that the passenger exiting the autonomous bus 100 is the owner of the bicycle 110 in the bicycle slot 120, and command the bicycle slot 120 to unlock after confirming that the passenger who put the bicycle 110 in the bicycle slot 120 has exited the autonomous bus 100.

FIG. 4 illustrates example components of a bicycle lock 130 controlled by the bicycle rack reservation system 105. As shown, the bicycle lock 130 includes a rail 170, the first wheel support 165 (shown as a hook), the second wheel support 175, a state actuator 135A, and a sensor 140. The rail 170 is formed from a rigid material, such as plastic or metal, that attaches to the autonomous bus 100. The hook is formed from a rigid material, such as plastic or metal, that is curved. The first wheel support 165 is mounted to the rail 170 and can move toward or away from the rail 170. That is, the first wheel support 165 can move toward the rail 170 to place the bicycle lock 130 in the locked position and away from the rail 170 to place the bicycle lock 130 in the unlocked position. The second wheel support 175 is formed from a rigid material, such as plastic or metal, that is attached to the rail 170 at a location spaced from the first wheel support 165. The second wheel support 175 can at least partially support the weight of the bicycle 110. The second wheel support 175 has an elliptical shape with a rim defining an opening. When placed in the bicycle lock 130, the bicycle wheel extends partially into the opening. The bicycle wheel is supported by the rim of the second wheel support 175. The second wheel support 175 helps prevent the bicycle 110 from swinging while the autonomous bus 100 is moving. The state actuator 135A, as discussed above, may move the first wheel support 165 from the locked position to the unlocked position, and vice versa. The sensor 140, as discussed above, may output a signal indicating whether a bicycle 110 is present in the bicycle lock 130. The sensor 140 may be located on the rail 170 near the first wheel support 165, near the second wheel support 175, or somewhere else. The camera 145 is also mounted to the rail 170. The camera 145 can capture an image of the passenger who mounts the bicycle 110 in the bicycle lock 130. The camera 145 may alternatively be located near the door of the autonomous bus 100, inside the autonomous bus 100, etc. In some possible approaches, multiple cameras 145 are used. For instance, a camera 145 may be located on the bicycle lock 130, one camera 145 may be located inside the autonomous bus 100 at a location where it can capture images of passengers entering or exiting the autonomous bus 100, a camera 145 may be located on the exterior of the autonomous bus 100 near the door to capture images of passengers as they enter the autonomous bus 100, etc.

FIGS. 5A-5B illustrate different states of the bicycle lock 130. FIG. 5A shows the bicycle lock 130 in the unlocked position. The state actuator 135A may move the first wheel support 165 away from the rail 170, creating an opening for receiving the bicycle 110. The sensor 140 may detect the presence of the bicycle 110 and move the first wheel support 165 toward the rail 170 to place the bicycle lock 130 in the locked position, shown in FIG. 5B. When the bicycle 110 is placed in the first wheel support 165, the state actuator 135A may move the first wheel support 165 to the locked position, as shown in FIG. 5A. When the passenger of the autonomous bus 100 is ready to remove his or her bicycle 110 from the bicycle lock 130, the processor 160 commands the state actuator 135A to move the first wheel support 165 to the unlocked position, as shown in FIG. 5B. The opening created by moving the first wheel support 165 to the unlocked position allows the bicycle 110 to be removed from the bicycle lock 130.

FIG. 6 illustrates the bicycle rack 115 having multiple bicycle locks 130. Each bicycle lock 130 is adjacent to another bicycle lock 130 with room for multiple bicycles 110 to be racked at the same time. Moreover, each bicycle lock 130 may be individually controlled by the processor 160. That is, the processor 160 may be programmed to determine which bicycle lock 130 was reserved by the passenger, which holds the bicycle 110 for a particular passenger exiting the autonomous bus 100, etc. The processor 160 may be programmed to selectively control the state actuator 135A associated with the first wheel support 165 of the bicycle lock 130 associated with the passenger. That way, the processor 160 need not release every bicycle lock 130 each time a passenger wishes to retrieve his or her bicycle 110 from the bicycle rack 115.

FIGS. 7A-7D illustrate another implementation of the bicycle lock 130 controlled by the bicycle rack reservation system 105. This implementation may be helpful if the bicycle rack 115 is high on the autonomous bus 100. It may also allow the bicycle rack 115 to be used by people who cannot lift a bicycle 110 or who are not tall enough to place the bicycle 110 in the bicycle lock 130. This implementation shows the rail 170, actuators 135, and sensor 140 of FIG. 4. This implementation replaces the hook and rim with claws that are selectively movable from a locked position to an unlocked position, and vice versa. In other words, both the first wheel support 165 and second wheel support 175 are shown as claws in FIG. 4. Each claw, whether acting as the first wheel support 165 or the second wheel support 175, may change positions based on signals generated by the processor 160. That is, the processor 160 may output commands to an actuator 135 (referred to as a "state actuator 135A") that moves the claw from the locked position to the unlocked position and from the unlocked position to the locked position. Each individual claw may be replaced with the hook or rim, however, and each state actuator 135A for each claw may be individually controlled to move the claw between the locked and unlocked positions.

Further, the bicycle lock 130 of FIGS. 7A-7D includes additional actuators 135 for controlling movement of the first wheel supports 165. That is, one of the other actuators 135 (e.g., a first actuator 135B) may move the first wheel support 165 along a slot 185 defined by the rail 170. The slot may extend along the length of the rail 170. One of the other actuators 135 (e.g., a second actuator 135C) may move the second wheel support 175 along the slot. The processor 160 may control the first actuator 135B and the second actuator 135C. The processor 160 may output signals to the first actuator 135B and to the second actuator 135C to move the first wheel support 165 and the second wheel support 175, respectively, at different times. For instance, as shown in FIGS. 8A-8G, the first wheel support 165 and second wheel support 175 may move along the rail 170 via the slot in a particular sequence and not necessarily at the same time.

Figure 7A:
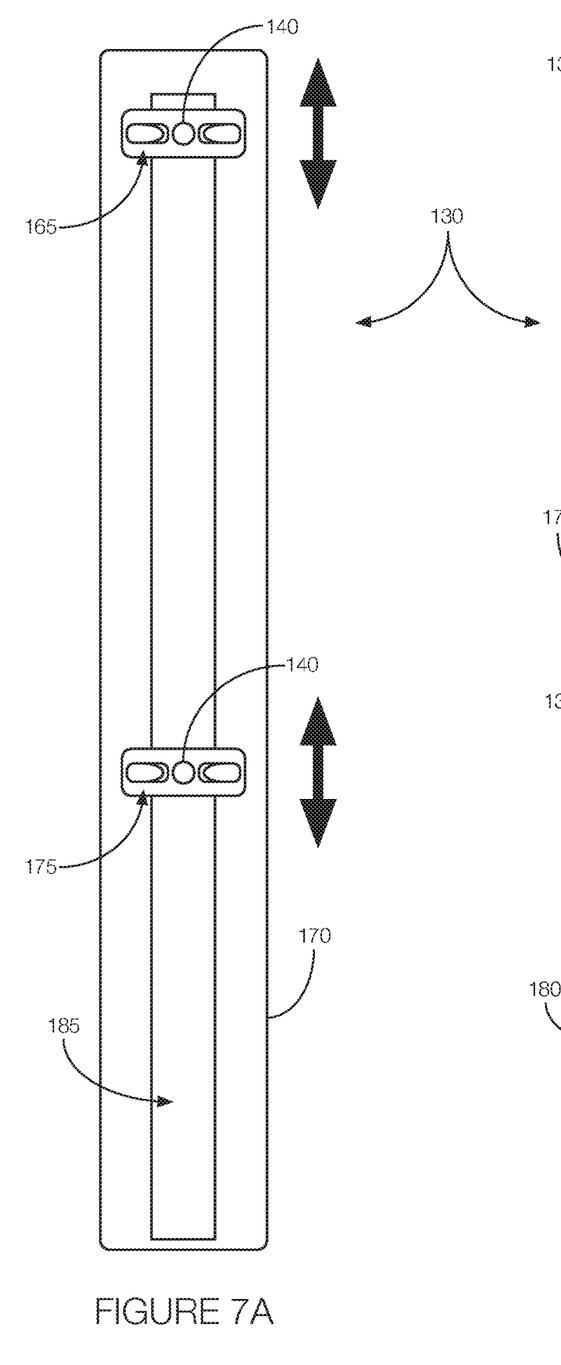
FIGS. 7A-7D illustrate another implementation of the bicycle lock controlled by the bicycle rack reservation system.
Figure 7B:
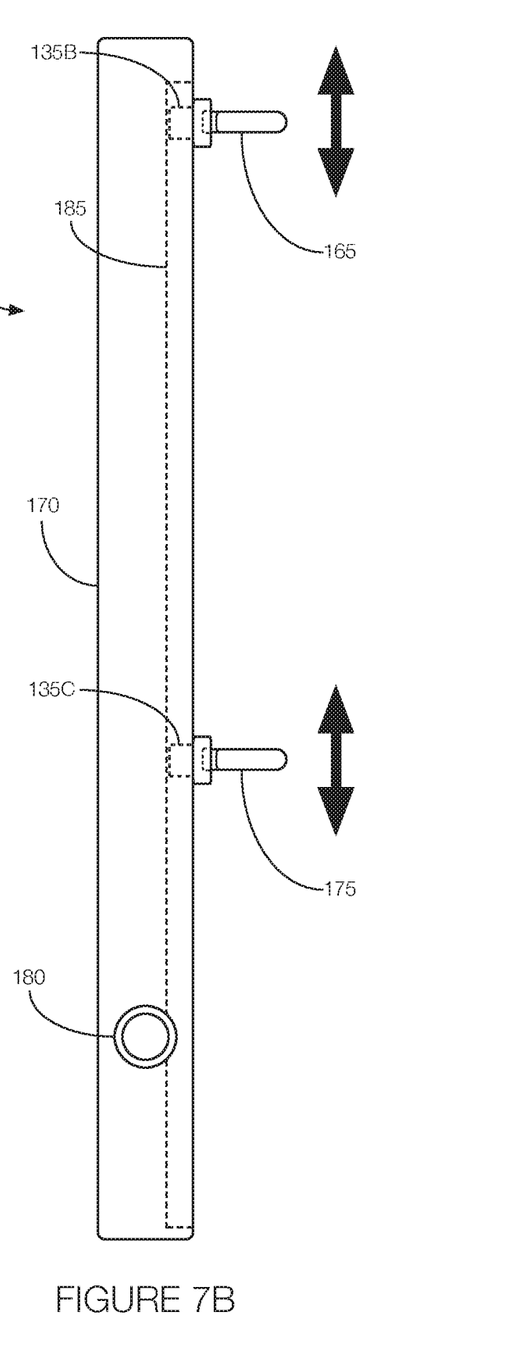
Figure 7C:
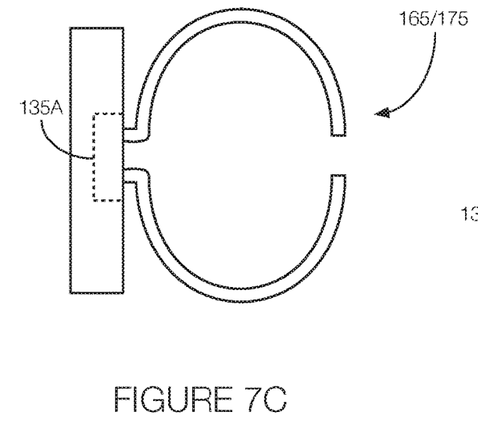
Figure 7D:
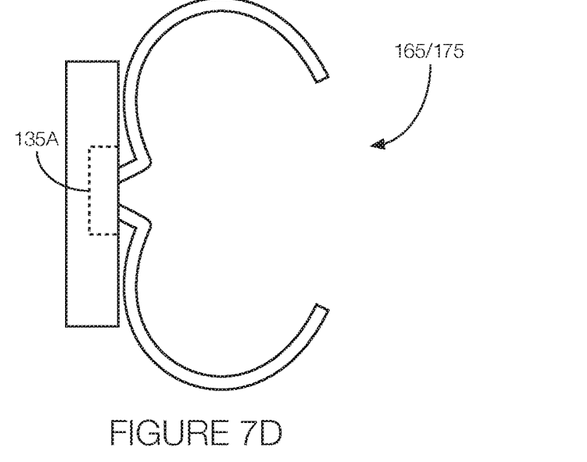

FIG. 7A illustrates the first and second actuators 135B, 135C moving the first wheel supports 165 along the rail 170. FIG. 7B illustrates a side view where both claws (i.e., the first wheel support 165 and the second wheel support 175) are in position where the bicycle 110 can be locked in the bicycle rack 115. FIG. 7B also illustrates a button 180 that the passenger may press to indicate that he or she is ready to remove the bicycle 110 from the bicycle lock 130. As discussed in greater detail below, removing the bicycle 110 from the bicycle slot 120 may benefit from human assistance. Therefore, pressing the button 180 may send a signal from the button 180 to the processor 160 indicating that the passenger is present and available to help. The processor 160 may control the first and second actuators 135B, 135C in sequence to lower the first wheel support 165 and second wheel support 175 after receiving the signal from the button 180. FIGS. 7C-7D show the first wheel support 165 or the second wheel support 175 as a claw with the state actuator 135A moving the first wheel support 165 or the second wheel support 175 from the locked position (FIG. 7C) to the unlocked position (FIG. 7D).

Figure 8A:
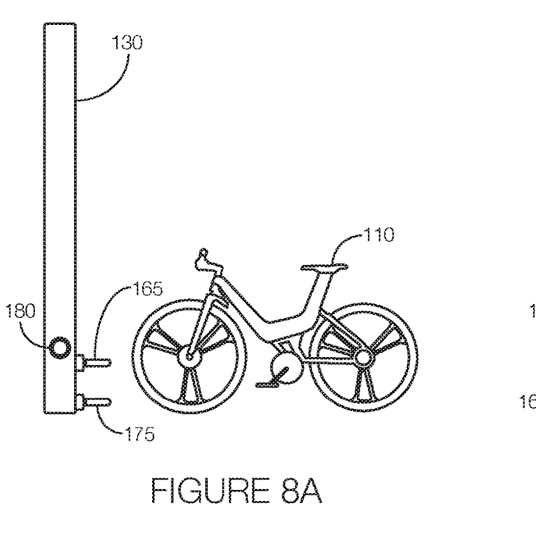
FIGS. 8A-8G illustrate how a bicycle is loaded onto the bicycle rack of FIGS. 7A-7D.
Figure 8B:
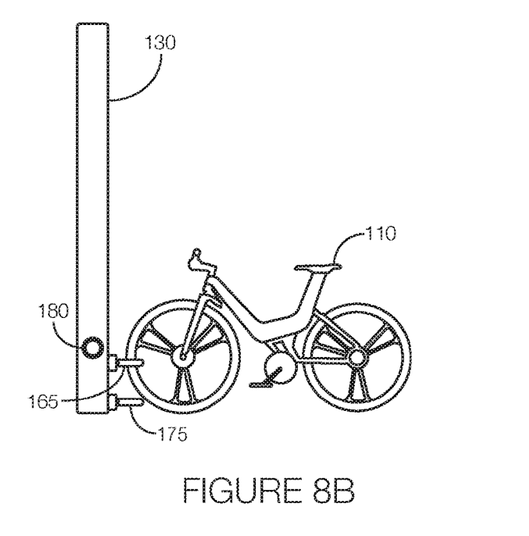
Figure 8C:
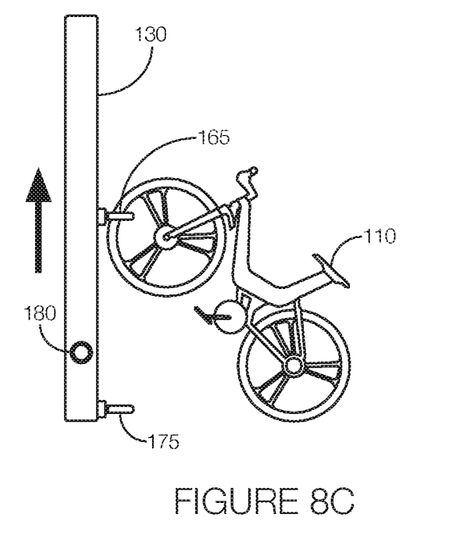
Figure 8D:
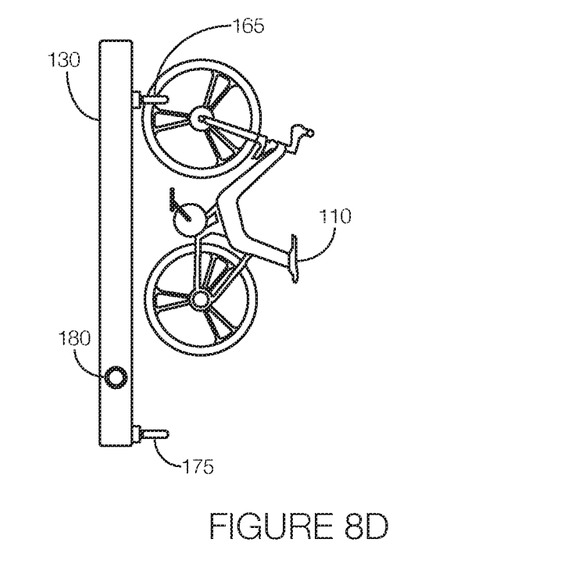
Figure 8E:
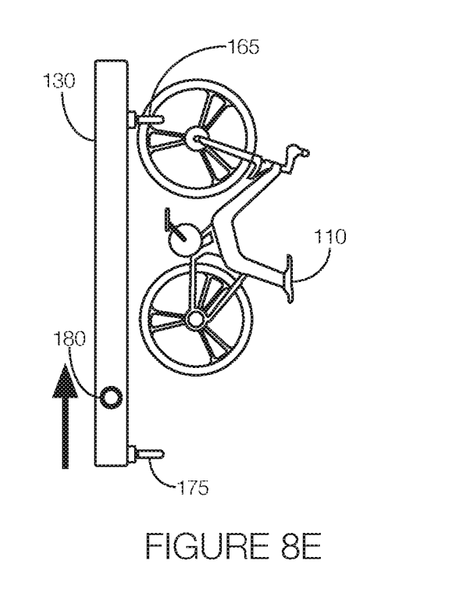
Figure 8F:
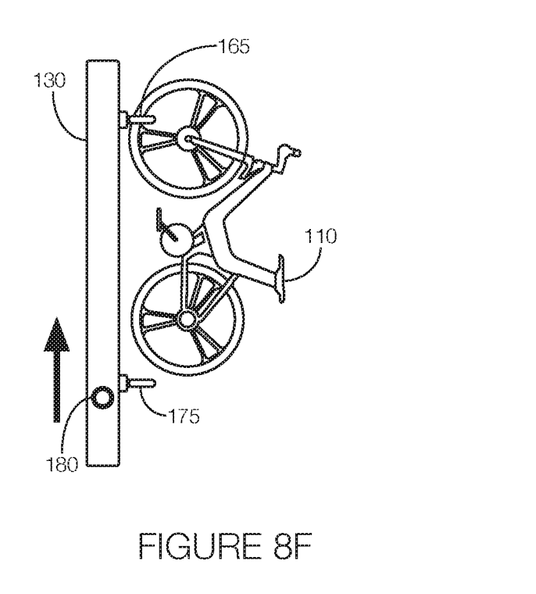
Figure 8G:
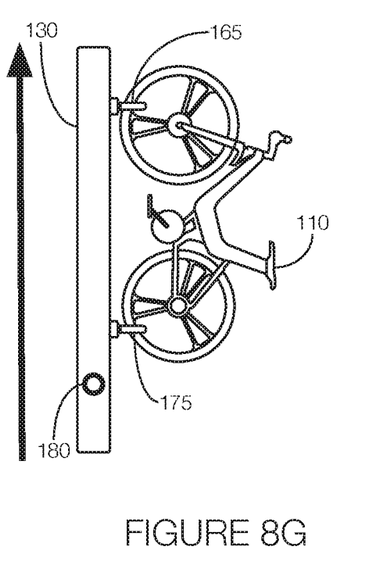

FIGS. 8A-8G illustrate how a bicycle 110 is loaded onto the bicycle rack 115 of FIGS. 7A-7D. The same concept may apply to any configuration of the first wheel support 165 (e.g., hooks or claws) or the second wheel supports 175 (e.g., hook, claw, or rim) are used. As shown in FIG. 8A, both the first wheel support 165 and the second wheel supports 175 are located near the bottom of the rail 170, and the bicycle 110 is placed near the first wheel support 165. One of the sensors 140 senses the bicycle 110 near the rail 170, and specifically, near the first wheel support 165, and outputs a signal to the processor 160 when the sensor 140 detects that the wheel is near the sensor 140 (e.g., within 1-3 inches of the sensor 140). The processor 160 commands the state actuator 135A for to put the claw of the first wheel support 165 in the closed position. That is, the processor 160 commands the state actuator 135A to close the fingers of the claw of the first wheel support 165 around the wheel of the bicycle 110 nearest the claw of the first wheel support 165 as shown in FIG. 8B. When the claw of the first wheel support 165 is in the locked position, the processor 160 may command the first actuator 135B to move the first actuator 135B to move the claw of the first wheel support 165 along the rail 170, causing the other wheel (i.e., the wheel not in the claw of the first wheel support 165) to roll toward the rail 170 as shown in FIG. 8C. Eventually, such as when the first actuator 135B is finished moving the claw of the first wheel support 165 along the rail 170, the other wheel will lift off the ground as shown in FIG. 8D. Then, the processor 160 may command the second actuator 135C to move the claw of the second wheel support 175 up the rail 170 toward the claw of the first wheel support 165. A sensor 140 incorporated into the claw of the second wheel support 175 or that otherwise moves with the second actuator 135C may output a signal when the other wheel is detected within a certain distance (e.g., 1-3 inches) of the sensor 140. The processor 160 may command the second actuator 135C to stop moving the claw of the second wheel support 175 in response to receiving the signal output by the sensor 140. That is, the receipt of the signal by the processor 160 may cause the processor 160 to command the second actuator 135C to stop moving the claw of the second wheel support 175 up the rail 170. FIG. 8E shows the claw of the second wheel support 175 at the time the second actuator 135C begins moving the claw of the second wheel support 175. FIG. 8F shows the claw of the second wheel support 175 when the claw of the second wheel support 175 is nearing the other wheel. FIG. 8G illustrates a view after the claw of the second wheel support 175 arrives at the other wheel, the sensor 140 outputs the signal, and the processor 160 commands the second actuator 135C to stop moving the claw of the second wheel support 175. Also shown in FIG. 8G, the processor 160 may command the claw of the second wheel support 175 to the closed position.

Figure 9A:
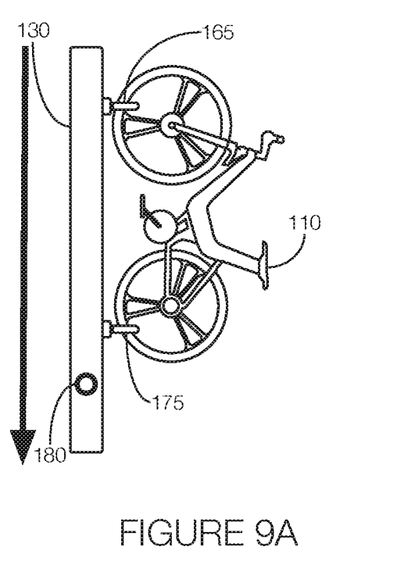
FIGS. 9A-9E illustrate the bicycle is unloaded from the bicycle rack of FIGS. 7A-7D.
Figure 9B:
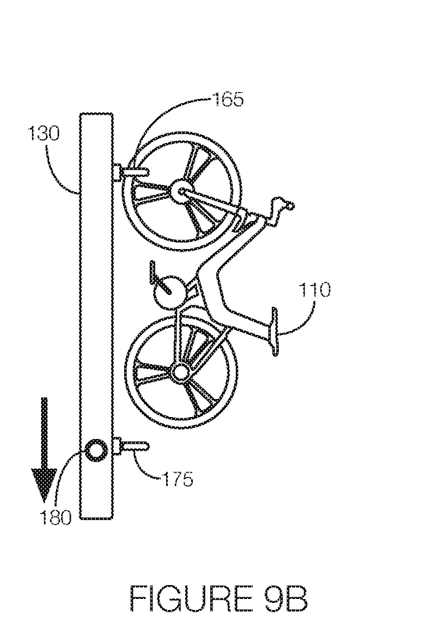
Figure 9C:
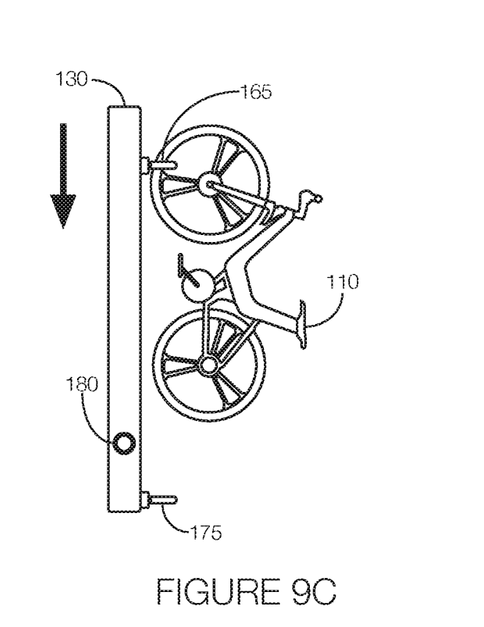
Figure 9D:
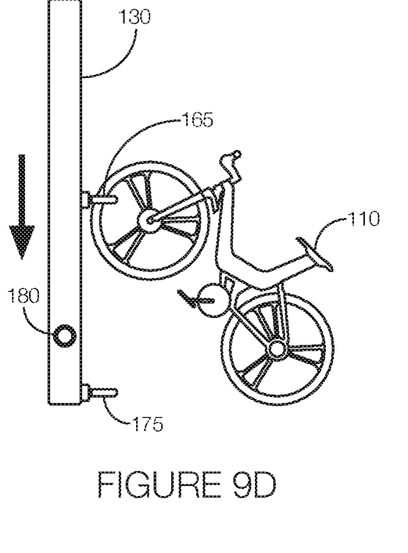
Figure 9E:
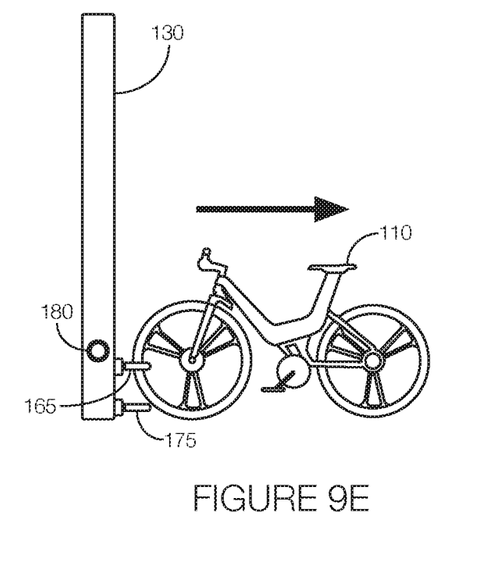

FIGS. 9A-9E illustrate how the bicycle 110 is unloaded from the bicycle rack 115 of FIGS. 7A-7D. Although the first wheel support 165 and second wheel supports 175 are shown as claws, a similar concept applies to the first wheel supports 165 and second wheel supports 175 implemented as hooks or rims. In FIG. 9A, the claw of the first wheel support 165 and claw of the second wheel support 175 are both in the locked position. The passenger may exit the autonomous bus 100, and the identity of the passenger who owns the bicycle 110 may be confirmed by the processor 160 via an image captured by the camera 145, as discussed above. The processor 160 may wait for the passenger to press the button 180. The button 180 outputs a signal to the processor 160, and the processor 160 may determine that the passenger has pressed the button 180 when the processor 160 receives the signal from the button 180. Then, the processor 160 may command the state actuator 135A of the claw of the second wheel support 175 to the unlocked position and command the second actuator 135C to move the claw of the second wheel support 175 to lower toward the bottom of the rail 170, as shown in FIG. 9B. In FIG. 9C, the processor 160 commands the first actuator 135B to lower the claw of the first wheel support 165 toward the bottom of the rail 170. In FIG. 9D, one wheel (e.g., the rear wheel) of the bicycle 110 may make contact with the ground. The passenger may help steady the bicycle 110 as the first actuator 135B continues to move the claw of the first wheel support 165 toward the bottom of the rail 170. When both wheels are on the ground, the processor 160 may command the state actuator 135A of the claw of the first wheel support 165 to unlock the claw of the first wheel support 165. Then, the passenger may roll the bicycle 110 out of the bicycle lock 130, as shown in FIG. 9E.

FIGS. 8A-8G and 9A-9E illustrate that the distances between the first wheel support 165 and second wheel support 175 may change during the processes of racking the bicycle 110 and removing the bicycle 110 from the bicycle rack 115 located on the autonomous bus 100. Further, with respect to the bicycle racks 115 shown in FIGS. 8A-9E, the bicycle rack 115 may raise and lower relative to the ground. That is, when a bicycle 110 is racked as shown in FIGS. 8A-8G or removed from the bicycle rack 115 as shown in FIGS. 9A-9E may move closer to the ground, and maybe even touch the ground, so that the bicycle 110 may be rolled into and out of the bicycle lock 130. Thus, after FIG. 8G, the entire bicycle rack 115, with the bicycle 110, may be lifted from the ground and locked in a raised position on the back of the autonomous bus 100. The bicycle rack 115 and bicycle 110 may be lowered toward the ground prior the process of removing the bicycle 110 beginning at FIG. 9A.

Figure 10:
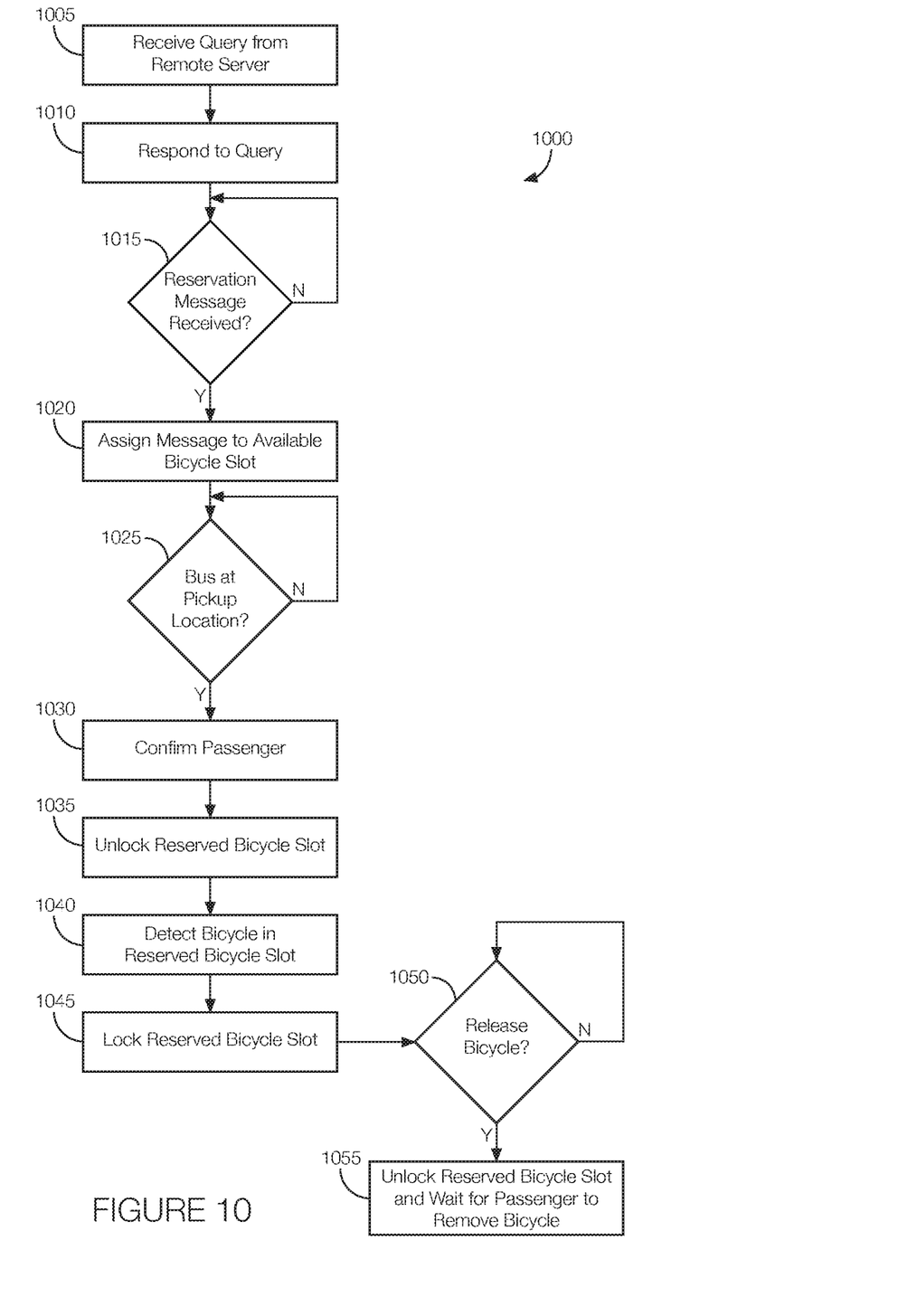
FIG. 10 is a flowchart of an example process that may be executed by the bicycle rack reservation system.

FIG. 10 is a flowchart of an example process 1000 that may be executed by the bicycle rack reservation system 105. The process 1000 may begin at any time that the autonomous bus 100 is operating and able to receive messages from, e.g., the remote server 125. The process 1000 may continue to run while the autonomous bus 100 is operating.

At block 1005, the bicycle rack reservation system 105 receives a query from the remote server 125. The query may be received via the communication interface 150. The query may request which, if any, bicycle slots 120 on the autonomous bus 100 are available during a particular time that a passenger will be on the autonomous bus 100. The query may be received by the communication interface 150 and processed by the processor 160.

At block 1010, the bicycle rack reservation system 105 responds to the query. As previously discussed, the communication interface 150 may transmit a list of available bicycle slots 120 to the remote server 125. The remote server 125 may select one of the bicycle slots 120 and assign that bicycle slot 120 to the passenger. Alternatively, the processor 160 may select a bicycle slot 120 from among those available and communicate the selected bicycle slot 120 to the remote server 125. The remote server 125 may incorporate that information (i.e., the reserved bicycle slot 120) in the bicycle slots reservation message.

At decision block 1015, the bicycle rack reservation system 105 waits for a bicycle slots reservation message. The bicycle slots reservation message may be transmitted from the remote server 125 and may indicate that a passenger wishes to reserve one of the bicycle racks 115 located on the autonomous bus 100. The bicycle slots reservation message may be received by the communication interface 150 and processed by the processor 160. When received, the process 1000 may proceed to block 1020. Otherwise, block 1015 may continue to be executed until the bicycle slots reservation message is received.

At block 1020, the bicycle rack reservation system 105 assigns the bicycle slots reservation message to one of the available bicycle slots 120 of the autonomous bus 100. That is, the processor 160 may update the list to indicate that one of the bicycle slots 120 is now reserved for the passenger associated with the bicycle slots reservation message. The processor 160 may assign the bicycle slot 120 for the duration of time the passenger will be on the autonomous bus 100.

At decision block 1025, the bicycle rack reservation system 105 determines if the autonomous bus 100 is at the location (e.g., the bus stop) where the passenger associated with the bicycle slots reservation message is going to board the autonomous bus 100. The processor 160 may make such a determination based on signals received from a navigation system incorporated into the autonomous bus 100, the bicycle rack reservation system 105, or the like. If the processor 160 determines that the autonomous bus 100 is at the pickup location, the process 1000 may proceed to block 1030. Otherwise, block 1025 may be repeated until the autonomous bus 100 arrives at the pickup location.

At block 1030, the bicycle rack reservation system 105 confirms that the person at the autonomous bus 100 is the passenger who reserved the bicycle slot 120. The camera 145 may capture an image of the passenger, and the processor 160 may process the image. The processor 160 may compare the image of the passenger to a known image of the passenger to confirm that the person is the passenger who reserved the bicycle slot 120. The known image of the passenger may be transmitted to the autonomous bus 100 with the bicycle slots reservation message. Alternatively, the processor 160 may confirm the identity of the passenger based on, e.g., a ticket held by the passenger. That is, the ticket may be scanned by the autonomous bus 100, and the processor 160 may receive a message from the autonomous bus 100 that the passenger is the person who reserved one of the bicycle slots 120. That message may further indicate which bicycle slot 120 was reserved by the passenger.

At block 1035, the bicycle rack reservation system 105 commands the bicycle lock 130 of the reserved bicycle slot 120 to an unlocked position. That may include the processor 160 outputting a signal to the state actuator 135A associated with one or both the first wheel support 165 and the second wheel support 175 to place the first wheel support 165, the second wheel support 175, or both, in the unlocked position.

At block 1040, the bicycle rack reservation system 105 detects a bicycle 110 in the bicycle slot 120. The sensor 140 may detect the bicycle 110 near the first wheel support 165, the second wheel support 175, or both. The sensor 140 may output a signal indicating that the bicycle 110 has been detected when the bicycle 110, specifically a wheel of the bicycle 110, is placed near, e.g., the first wheel support 165. The processor 160 may receive the signal output by the sensor 140 and determine that the bicycle 110 is in the bicycle slot 120 upon receipt of the signal.

At block 1045, the bicycle rack reservation system 105 commands the bicycle lock 130 of the reserved bicycle slot 120 to a locked position. Commanding the bicycle lock 130 to the locked position may include the processor 160 outputting various signals to the state actuator 135A, the first actuator 135B, the second actuator 135C, etc., as discussed above. For instance, commanding the bicycle lock 130 to the locked position may include the processor 160 commanding the first wheel support 165 to the locked position, the second wheel support 175 to the locked position, or both. Further, as previously discussed, commanding the bicycle lock 130 to the locked position may include commanding the first actuator 135B to move the first wheel support 165 along the rail 170 after commanding the state actuator 135A of the first wheel support 165 to place the first wheel support 165 in the locked position but before commanding the state actuator 135A of the second wheel support 175 to place the second wheel in the locked position. When the movement of the first wheel support 165 facilitated by the first actuator 135B causes the other wheel of the bicycle 110 to be near the rail 170, the processor 160 may command the second actuator 135C to move the second wheel support 175 along the rail 170 toward the second wheel support 175. Then, the processor 160 may command the state actuator 135A of the second wheel support 175 to place the second wheel support 175 in the locked position when the wheel is near the second wheel support 175, which may be detected by a sensor 140 located in or otherwise associated with the second wheel support 175. Thus, the first wheel support 165 and second wheel support 175 may move relative to the rail 170 independently of one another, and the distance between the first wheel support 165 and the second wheel support 175 may change.

At decision block 1050, the bicycle rack reservation system 105 determines whether to release the bicycle 110 to a passenger exiting the autonomous bus 100. The camera 145 may capture an image of a passenger exiting the autonomous bus 100, and the image may be provided to the processor 160. The processor 160 may compare the image to a known image of the processor 160, which could be the image captured at block 1030. If the processor 160 confirms that the passenger exiting the autonomous bus 100 is the person who placed the bicycle 110 in the bicycle rack 115, the process 1000 may proceed to block 1055. Otherwise, the process 1000 may repeat block 1050.

At block 1055, the bicycle rack reservation system 105 commands the autonomous bus 100 to wait until the bicycle 110 is removed from the bicycle rack 115. That way, the passenger will have time to remove his or her bicycle 110 before the autonomous bus 100 proceeds to its next step. Further, at block 1055, the bicycle rack reservation system 105 commands the bicycle lock 130 storing the passenger's bicycle 110 to the unlocked position. That is, the processor 160 may command the state actuator 135A of the first wheel support 165 to place the first wheel support 165 in the unlocked position so the bicycle 110 can be removed from the first wheel support 165. In another possible approach, the processor 160 may wait for the passenger to press the button 180, which as discussed above, outputs a signal to the processor 160 indicating that the passenger is ready to remove the bicycle 110 from the bicycle lock 130. Then, the processor 160 may command the state actuator 135A of the second wheel support 175 to the unlocked position and command the second actuator 135C to move the second wheel support 175 to lower toward the bottom of the rail 170. The processor 160 may further command the first actuator 135B to lower the first wheel support 165 toward the bottom of the rail 170. One wheel (e.g., the rear wheel) of the bicycle 110 may make contact with the ground, and the passenger may help steady the bicycle 110 as the first actuator 135B continues to move the first wheel support 165 toward the bottom of the rail 170. When both wheels are on the ground, the processor 160 may command the state actuator 135A of the first wheel support 165 to unlock the first wheel support 165. Then, the passenger may roll the bicycle 110 out of the bicycle lock 130.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a bicycle lock that includes a first wheel support for a first wheel of a bicycle and an actuator configured to move the first wheel support along a rail mounted to a bus; and
a processor programmed to receive a bicycle slot reservation message, assign the bicycle slot reservation message to a bicycle slot of the bus, command the bicycle lock associated with the bicycle slot to an unlocked position, detect a bicycle placed in the bicycle slot, and command the bicycle lock to a locked position, including commanding the actuator to move the first wheel support along the rail mounted to the bus.

2. The vehicle system of claim 1, wherein the bicycle lock includes a second wheel support for a second wheel of the bicycle spaced from the first wheel support.

3. The vehicle system of claim 2, wherein the bicycle lock includes a second actuator configured to move the second wheel support in accordance with signals output by the processor.

4. The vehicle system of claim 3, wherein the second wheel support is moveable relative to the rail.

5. The vehicle system of claim 4, wherein a distance between the first wheel support and the second wheel support is changeable.

6. The vehicle system of claim 4, wherein the processor is programmed to command the first actuator to move along the rail before commanding the second actuator to move along the rail.

7. The vehicle system of claim 1, further comprising a sensor programmed to detect the bicycle placed in the bicycle slot and output a signal indicating that the bicycle has been placed in the bicycle slot, wherein the processor is programmed to detect the bicycle placed in the bicycle slot based at least in part on the signal output by the sensor.

8. The vehicle system of claim 1, further comprising a camera programmed to capture an image.

9. The vehicle system of claim 8, wherein the processor is programmed to receive the image captured by the camera, process the image, determine that the image is of a bicycle owner, and command the bicycle lock to the unlocked position after determining that the image is of the bicycle owner.

10. A vehicle system comprising:
a first bicycle lock associated with a first bicycle slot of a bus, wherein the first bicycle lock includes a first wheel support for a first wheel of a bicycle and a first actuator configured to move the first wheel support along a rail mounted to the bus;
a second bicycle lock associated with a second bicycle slot of the bus; and
a processor programmed to receive a bicycle slot reservation message, assign the bicycle slot reservation message to the first bicycle slot, command the first bicycle lock to an unlocked position, detect a bicycle placed in the first bicycle slot, and command the first bicycle lock to a locked position, including commanding the first actuator to move the first wheel support along the rail mounted to the bus.

11. The vehicle system of claim 10, wherein the second bicycle lock includes:
a second wheel support; and
a second actuator configured to move the second wheel support in accordance with signals output by the processor.

12. The vehicle system of claim 11, wherein the first bicycle lock includes a third wheel support spaced from the first wheel support, and the second bicycle lock includes a fourth wheel support spaced from the second wheel support.

13. The vehicle system of claim 12, wherein the first bicycle lock and the second bicycle lock include respective third and fourth actuators configured to move the third and fourth wheel supports, respectively, in accordance with signals output by the processor.

14. The vehicle system of claim 13, wherein the second bicycle lock includes a second rail, and wherein the first wheel support and the second wheel support are moveable relative to the rail.

15. The vehicle system of claim 14, wherein the processor is programmed to command the first actuator of the first bicycle lock to move along the rail of the first bicycle lock before commanding the third actuator of the first bicycle lock to move along the rail of the first bicycle lock.

16. The vehicle system of claim 10, further comprising a first sensor programmed to detect the bicycle placed in the first bicycle slot and output a signal indicating that the bicycle has been placed in the first bicycle slot, wherein the processor is programmed to detect the bicycle placed in the first bicycle slot based at least in part on the signal output by the first sensor.

17. The vehicle system of claim 10, further comprising a camera programmed to capture an image.

18. The vehicle system of claim 17, wherein the processor is programmed to receive the image captured by the camera, process the image, determine that the image is of a bicycle owner of the bicycle in the first bicycle slot, and command the first bicycle lock to the unlocked position after determining that the image is of the bicycle owner of the bicycle in the first bicycle slot.

* * * * *